United States Patent [19]
Dougherty, Jr. et al.

[11] 3,975,955
[45] Aug. 24, 1976

[54] EDGETONE SUPPRESSION DEVICE FOR WIND TUNNEL WALLS

[75] Inventors: Nathan S. Dougherty, Jr.; Charles F. Anderson, both of Tullahoma, Tenn.

[73] Assignee: The United States of America as represented by the Secretary of the Air Force, Washington, D.C.

[22] Filed: June 27, 1975

[21] Appl. No.: 590,981

[52] U.S. Cl. .................................................. 73/147
[51] Int. Cl.² ........................................... G01M 9/00
[58] Field of Search ................... 73/147; 181/42, 59

[56] References Cited
UNITED STATES PATENTS

| | | | |
|---|---|---|---|
| 2,799,161 | 7/1957 | Greene et al. .......................... | 73/147 |
| 2,850,873 | 9/1958 | Hausmann .............................. | 73/147 |
| 2,968,944 | 1/1961 | Manoni.................................... | 73/147 |
| 3,113,635 | 10/1963 | Allen et al. ............................ | 181/42 |
| 3,263,772 | 8/1966 | Irwin et al............................... | 181/59 |

FOREIGN PATENTS OR APPLICATIONS

670,930  4/1952  United Kingdom................... 73/147

*Primary Examiner*—Richard C. Queisser
*Assistant Examiner*—Daniel M. Yasich
*Attorney, Agent, or Firm*—Joseph E. Rusz; Richard J. Killoren

[57] ABSTRACT

A wind tunnel having a test section, located within a plenum, with the walls of the test section containing a plurality of small holes which permits flow, through the holes and plenum, for unchoking the test section when the wind tunnel is operating near sonic speeds. A splitter plate, to suppress edge tones, is positioned in each of the holes along the direction of flow which divides the holes into a left and a right half with respect to the direction of flow.

2 Claims, 8 Drawing Figures

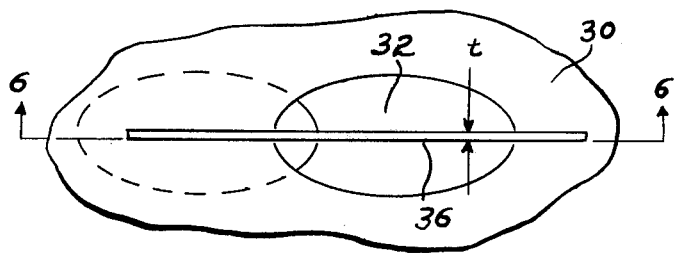
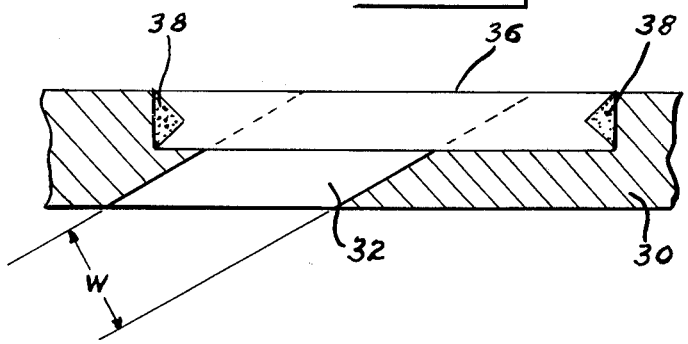
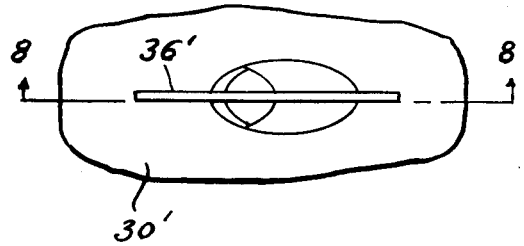
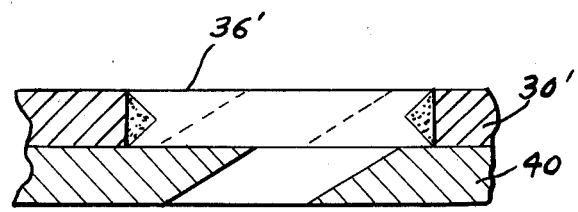

EDGETONE SUPPRESSION DEVICE FOR WIND TUNNEL WALLS

RIGHTS OF THE GOVERNMENT

The invention described herein may be manufactured and used by or for the Government of the United States for all governmental purposes without the payment of any royalty.

BACKGROUND OF THE INVENTION

This invention relates to the wall structure for the test section of a wind tunnel. The wind tunnels which have a test section with perforated walls enclosed completely in a plenum chamber, the plenum chamber can be evacuated to allow part of the tunnel main flow to be removed through the perforated walls of the test section. This provides a means for the attenuation of disturbance waves when the wind tunnel is operating above sonic speeds.

High speed flow parallel to walls having cavities or perforations will cause edgetones to emanate from the wall. Each of the holes generates a tone, with the entire wall producing tones in phase, with strong resonance amplication between opposite walls intensifying the noise.

BRIEF SUMMARY OF THE INVENTION

According to this invention, a splitter plate is installed in each of the holes. The plate is aligned along the direction of flow along the walls. The holes are thus divided into a left and right half with respect to the direction of flow. The plate may be anywhere from about half the hole depth to the full hole depth. The thickness of the plate must, however, be sufficient for structural integrity. The splitter plate suppresses the edgetones that would otherwise emanate from the high speed flow parallel to the wall.

In the drawings:

FIG. 5 is a top plan view of the device of FIG. 4.

FIG. 6 is a sectional view of the device of FIG. 5 along the line 6—6.

FIG. 7 shows a modification of the wind tunnel test section wall of the device of FIG. 1.

FIG. 8 is a sectional view of the device of FIG. 7 along the line 8—8.

DETAILED DESCRIPTION OF THE INVENTION

Figure 1:
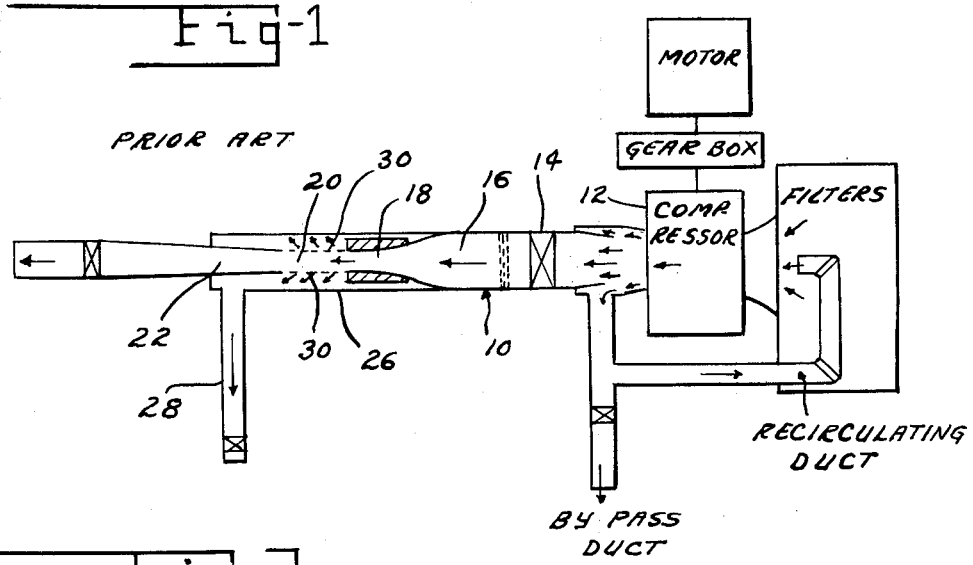
FIG. 1 is a schematic diagram of a prior art wind tunnel with which the device of the invention may be used.

Reference is now made to FIG. 1 of the drawing which shows a conventional transonic wind tunnel 10 having a compressor 12, a main control valve 14, a stagnation chamber 16, a nozzle region 18, a test section 20 and a diffuser region 22. The test section 20 is positioned within a plenum chamber 26 which may be evacuated through a duct 28. The test section 20 has perforated walls 30, to permit a part of the main flow to be removed through the perforated walls 30 and plenum 26 through duct 28.

Figure 2:
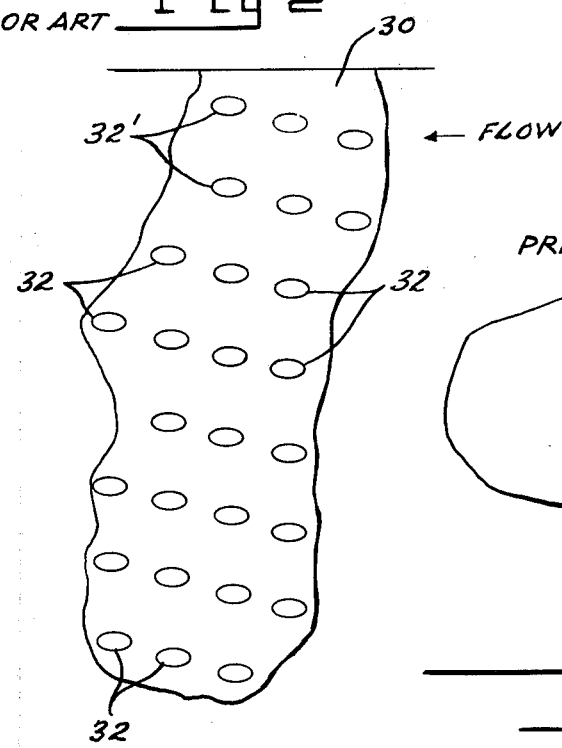
FIG. 2 is a partially cut away plan view of wall for the wind tunnel of FIG. 1.
Figure 3:
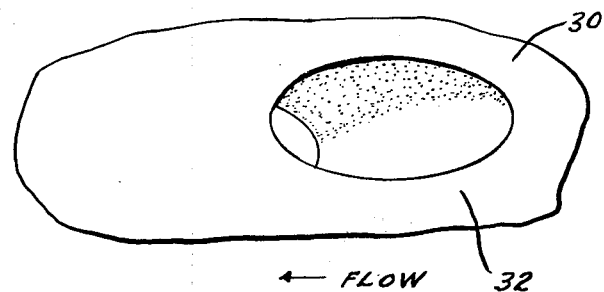
FIG. 3 is an elarged perspective view of one of the holes for the device of FIG. 2.

The walls in the test section, of the device shown in FIG. 1, were developed specifically to cancel both shock and expansion waves from the test models at supercritical speeds near Mach 1.2. The walls 30 have a plurality of holes, as shown in greater detail in FIGS. 2 and 3. The holes 32 are inclined, in the direction of flow, at an angle of 60° to the perpendicular to the wall and have a special differential resistance between inflow and outflow which gives favorable cancellation. The high speed flow parallel to the wall containing the holes causes edgetones to occur. The edge tones are characterized as, intense whistling noise at discrete frequencies which increase as the free-stream Mach number of the flow is increased.

Three elements are essential to the formation of an edgetone: (1) there must be a shear layer of flow over such distance that the flow will be inherently unstable, (2) any instability in the shear layer causes the formation of a vortex, (3) the vortex during downstream movement must encounter a rigid object, in this case, the hole trailing edge. The vortex in the shear layer imposes a force on the trailing edge. The rigid wall edge in turn generates a sound field propagating upstream along the shear layer. Sound waves striking the opposing wall of the tunnel are reflected back; and the combined initial and reflected wave action is to sustain the vortex generation in each hole in a self-sufficient periodic mode of instability that produces a continuously generated discrete tone from the enclosure formed by the four perforated walls.

Figure 4:
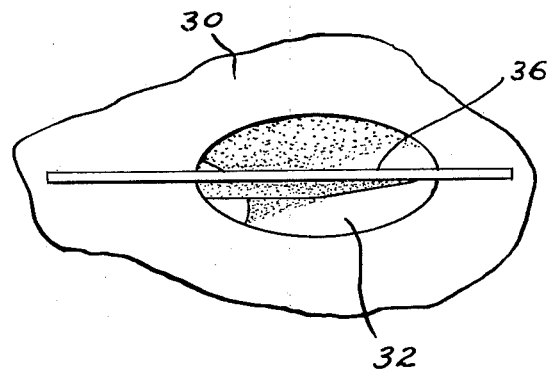
FIG. 4 shows the device of FIG. 3 modified according to the invention.

According to this invention, a splitter plate 36 is positioned in each of the holes as shown in FIGS. 4–6. The plate may extend from about one-half the depth of the hole to the full depth of the hole. The plate should have a sufficient thickness for structural integrity. In one device constructed, thickness $t$ was about $1/12\ w$ as shown in FIGS. 5 and 6. The plates 36 should be positively locked into the wall such as with a bonding agent, shown at 38 in FIG. 6. Every hole in the walls should have a splitter plate because of many possible wave coalescence patterns for phasing compatibility if any pattern or group of holes remain without splitter plates.

The device thus far described is with respect to a fixed porosity wall. The splitter plate can also be used with a variable porosity wall as shown in FIGS. 7 and 8 wherein a backing cutoff plate 40 is movable with respect to wall member 30' to vary the perforation open area, which further reduces wall interference at some conditions. In this device, the plate 36' extends only through the wall 30' and is secured to the wall 30' in the same manner as shown in FIGS. 5 and 6.

The principle of operation at work in the device of this invention for edgetone suppression is the alteration of the vortex development in each hole with inherent stability being derived from viscous interactions through (1) alteration of the shear layer formed at the leading edge by allowing it to attach to the plate surface, (2) suppression of the three-dimensional flow cycle within the hole, which coupled with a sound wave from the trailing edge, would bolster the shear layer deflection and thus the development of a vortex, and (3) inclusion of an additional edge transverse to the trailing edge which tends to disrupt the shearing mechanism which generates the sound waves. While the device suppresses this dynamic flow phenomenon, alteration of the steady flow phenomenon through the hole should be minimal except for some change in resistance due to the presence of the plate.

With the use of the splitter plate, there was effective suppression of edgetones with a resultant noise level reduction by a factor of 4 in one device tested and by a factor of 6 in another device tested.

While the device has been described with respect to a particular wind tunnel for a particular purpose, it is to be understood that the device of the invention could be used in any device wherein there is high speed flow parallel to walls having cavities or perforations which cause edgetones to emanate from the walls.

There is thus provided an apparatus for substantially reducing the noise level in perforated walls used in the test section of wind tunnels.

We claim:

1. In a wind tunnel having an expansion nozzle; means for supplying compressed gas upstream of said nozzle; a test section downstream of said nozzle; a diffuser downstream of said test section; a plenum chamber surrounding the test section; a plenum evacuation duct connected to said plenum chamber; at least a portion of the walls of said test section having a plurality of holes extending through the walls to permit the flow of gas from the test section to the plenum chamber; an edgetone suppressor for said wind tunnel test section comprising: a splitter plate in all of the holes in the walls of the test section; said splitter plate extending parallel to the direction of flow from a front leading edge of the holes to the trailing edge of the holes to thereby divide the hole into a left half portion and a right half portion in the direction of flow through the chamber.

2. The device as recited in claim 1 wherein said test section walls have first perforated wall members adjacent the flow and adjustable perforated backing cutoff plates adjacent each of the first perforated wall members; said splitter plates being positioned in the holes of only the first perforated wall members.

* * * * *